United States Patent [19]
Tucker

[11] Patent Number: 6,129,426
[45] Date of Patent: Oct. 10, 2000

[54] TRACKED VEHICLE WITH IMPROVED GUIDE WHEEL ASSEMBLY

[75] Inventor: Jasper James Tucker, Medford, Oreg.

[73] Assignee: Tucker Sno-Cat Corporation, Medford, Oreg.

[21] Appl. No.: 09/031,317

[22] Filed: Feb. 25, 1998

[51] Int. Cl.[7] .................................................. B62D 55/14
[52] U.S. Cl. ........................................ 305/136; 305/142
[58] Field of Search ................................. 305/124, 125, 305/130, 135, 136, 137, 139, 142; 152/393, 394, 323

[56] References Cited

U.S. PATENT DOCUMENTS

| | | | |
|---|---|---|---|
| 1,707,815 | 4/1929 | Robb | 152/394 X |
| 2,992,863 | 7/1961 | Fredricks et al. | |
| 3,452,798 | 7/1969 | Ravreby | 152/323 |
| 3,597,018 | 8/1971 | Masaoka | 305/136 X |
| 3,717,211 | 2/1973 | Carter . | |
| 3,758,169 | 9/1973 | Trapp . | |
| 3,787,099 | 1/1974 | Tucker et al. . | |
| 3,797,895 | 3/1974 | Tomizawa . | |
| 3,857,616 | 12/1974 | Tucker et al. . | |
| 3,997,217 | 12/1976 | Bandet et al. | 305/137 X |
| 4,696,520 | 9/1987 | Henke et al. . | |
| 4,961,395 | 10/1990 | Coast | 305/137 X |
| 5,161,866 | 11/1992 | Johnson . | |
| 5,312,176 | 5/1994 | Crabb | 305/136 X |
| 5,855,421 | 1/1999 | Kautsch | 305/136 |

FOREIGN PATENT DOCUMENTS

| | | | |
|---|---|---|---|
| 3413321 | 10/1985 | Germany | 152/323 |
| 55-39838 | 3/1980 | Japan | 305/139 |
| 6-64568 | 3/1994 | Japan | 305/137 |

*Primary Examiner*—Russell D. Stormer
*Attorney, Agent, or Firm*—Klarquist Sparkman Campbell Leigh & Whinston, LLP

[57] ABSTRACT

An endless track unit for a tracked vehicle has guide wheel assemblies which support the track. A guide wheel assembly includes a hub adapted to be rotatably mounted on an axle, the hub having axially-spaced outer flanges of an outer diameter no greater than a first diameter. A central flange on the hub extends radially outwardly beyond the first diameter. A pair of outer axially-spaced wheels are mounted on the outer flanges and a central ring-like wheel having an inner diameter greater than the first diameter is secured to the central flange. The hub is generally an integral, or unitary, element adapted to be mounted on an axle and supports all three wheels. The wheels are substantially rigid rings, and each has an elastomeric covering formed about its periphery for cushioned engagement with the track.

16 Claims, 5 Drawing Sheets

TRACKED VEHICLE WITH IMPROVED GUIDE WHEEL ASSEMBLY

FIELD OF THE INVENTION

The present invention relates to a tracked vehicle having an endless track, and more particularly to an improved guide wheel assembly for supporting the track.

BACKGROUND OF THE INVENTION

Endless track-driven vehicles are commonly used off-road in difficult terrain conditions such as in mud, snow, sand and tundra. For example, tracked vehicles are used in snow for grooming ski slopes and snow mobile trails, for transporting skiers to back-country slopes, for ski resort maintenance work, and for utility company maintenance work.

Tracked vehicles generally are of two types. Many are two-tracked, in which a pair of endless track units, one on each of the opposite sides of the vehicle, support and drive the vehicle. The other type is four-tracked, in which four separately driven and independently suspended track units, two in front and two in the rear, support and drive the vehicle.

Four-tracked vehicles have certain advantages over two-tracked vehicles under extreme conditions such as on steep slopes and in very rough terrain because of the flexible independent suspension of the four-tracked units and the constant power available to all four-tracked units, even while turning. Unlike a two-tracked vehicle, which relies on the differential speed of the two tracks for turning, the four-tracked vehicle steers much like a wheeled vehicle. Its endless track units can be physically turned for steering.

Despite the advantages of four-tracked vehicles over two-tracked vehicles under extreme terrain conditions, the nature of four-tracked vehicles is such that there are several inherent problems with prior designs.

In many tracked vehicles the lower, ground engaging, run of the track has been supported by a plurality of single element guide wheels disposed substantially in line longitudinally of the track and generally engaging only a centralized region of the track. Although this system, with a single line of guide or support wheels, functioned adequately, it was found that substantial deflection of the track on opposite sides of the guide wheels was occurring. This deflection was caused generally by the high point load at the center of the lateral dimension of the track which could lead to premature failure of elements in the track due to high cyclical stresses.

Further, although inwardly directed lugs may have been provided on the track to engage opposite sides of the single guide wheels, it has been found that periodically during operation and turning the guide wheels may move out of the proper track between the lugs and misalignment of the track occurs.

Further, in prior devices with a single centrally located guide wheel the upward deflection which occurred in the track toward opposite sides of the wheel could allow the track, when moving along a side hill, to slide somewhat sideways down a hill, rather than maintaining a stable line of travel as desired.

SUMMARY OF THE INVENTION

A general object of the present invention is to provide a tracked vehicle with a novel guide wheel assembly for supporting a track, which guide wheel assembly has a pair of outer, axially spaced wheels mounted on a single hub, with a central wheel mounted on the hub between the outer wheels and spaced from each of the outer wheels, all of which wheels engage the track to provide a substantially wide support to reduce bending of the track during operation.

Another object of the invention is to provide such a novel guide wheel assembly which, due to its having a wider supporting footprint than previously known single guide wheels, provides a more even load distribution for the track to reduce ground disturbance during use.

Yet another object of the invention is to provide a novel guide wheel assembly for a tracked vehicle having multiple wheels mounted on a single hub, distributing the weight over more wheel surface to obtain longer wheel and track life.

A still further object of the present invention is to provide a novel guide wheel assembly for a tracked vehicle having a unitary hub adapted to be mounted on an axle and having replaceable ring-style wheels mounted thereon which are easily removable and replaceable. By providing separate ring-style wheels or rims, each wheel can be replaced independently and economically.

Yet another object is to provide a novel guide wheel assembly for a tracked vehicle including a unitary hub which hub has an outer diameter adjacent its opposite ends to which outer, axially spaced wheels are mounted, and a central radially extending flange of a greater outer diameter to which a central ring-style wheel is secured. The inner diameter of the central wheel is greater than the outer diameter of the outer end portions of the hub allowing it to be easily slipped onto or removed from the hub for replacement.

Another object of the present invention is to provide a wheel in such a guide wheel assembly with a substantially rigid ring portion having a peripheral edge of a defined cross-sectional configuration and an elastomeric covering extending about said periphery having a complementary inner configuration to fit tightly and securely on the periphery of the rigid ring.

A still further object of the present invention is to provide a tracked vehicle having an endless track with inwardly projecting lugs which are laterally spaced apart and a guide wheel assembly having a plurality of wheels on an integral, or unitary, hub spaced apart in a pattern complementary to the spacing of the lugs on the track to fit between the lugs and provide greater assurance that the wheel assembly and the track remain in proper alignment and engagement during operation.

Yet, another object of the present invention is to provide a guide wheel assembly for such a tracked vehicle in which a substantially unitary, or integral, hub is provided on which three wheels are mounted with only a single bearing assembly required to mount such on an axle to rotatably support all three guide wheels in the assembly.

These and other objects and advantages will become more apparent from the following detailed description when read in conjunction with the accompanying drawings.

DETAILED DESCRIPTION OF A PREFERRED EMBODIMENT

To provide a comprehensive disclosure without unduly lengthening the specification, applicant incorporates by reference the disclosures of U.S. Pat. Nos. 3,787,099 and 3,857,616.

Figure 1:
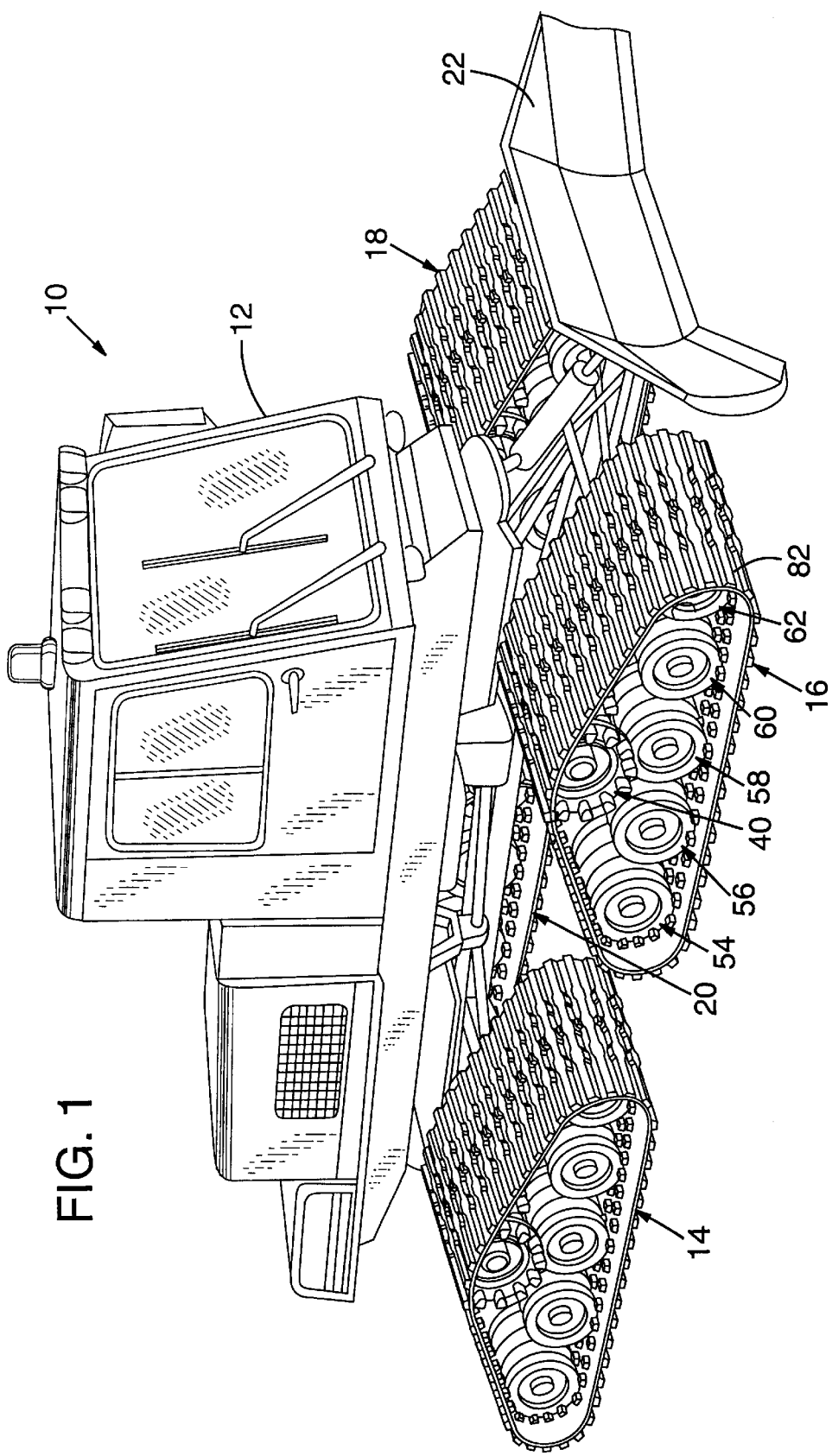
FIG. 1 is a perspective view of a four-tracked all-terrain vehicle having endless track units supported on guide wheel assemblies according to a preferred embodiment of the invention.

Referring first to FIG. 1, a four-tracked all-terrain vehicle 10 is shown having a vehicle body 12 supported by four identical endless track units 14, 16, 18, and 20, respectively. Track assemblies 14 and 20 are mounted at opposite sides of the rear of the vehicle, while track assemblies 16, 18 are mounted at opposite sides of the front of the vehicle. Each endless track assembly is independently mounted, driven and steerable in a well-known manner. At the forward end of the vehicle a snow plow, or grader blade, 22 is illustrated. It should be recognized that a vehicle as shown is adapted to have a variety of attachments mounted at its front or rear ends for multiple operations over a variety of terrain.

Figures 2, 7:
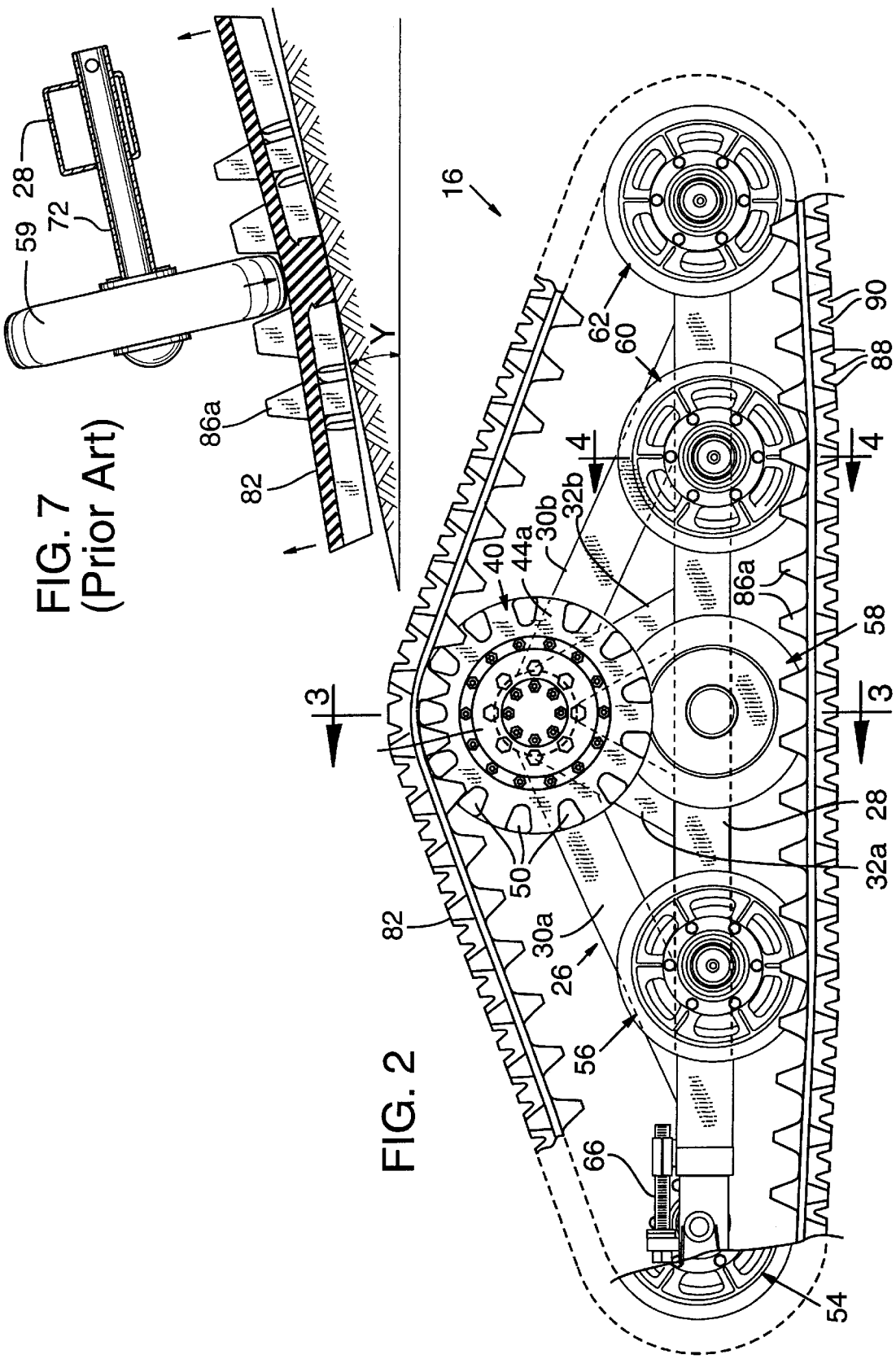
FIG. 2 is an enlarged side elevation view of an endless track unit of FIG. 1.
FIG. 7 is a view similar to FIG. 4, but illustrating a prior guide wheel device in operation on a side hill slope.
Figure 3:
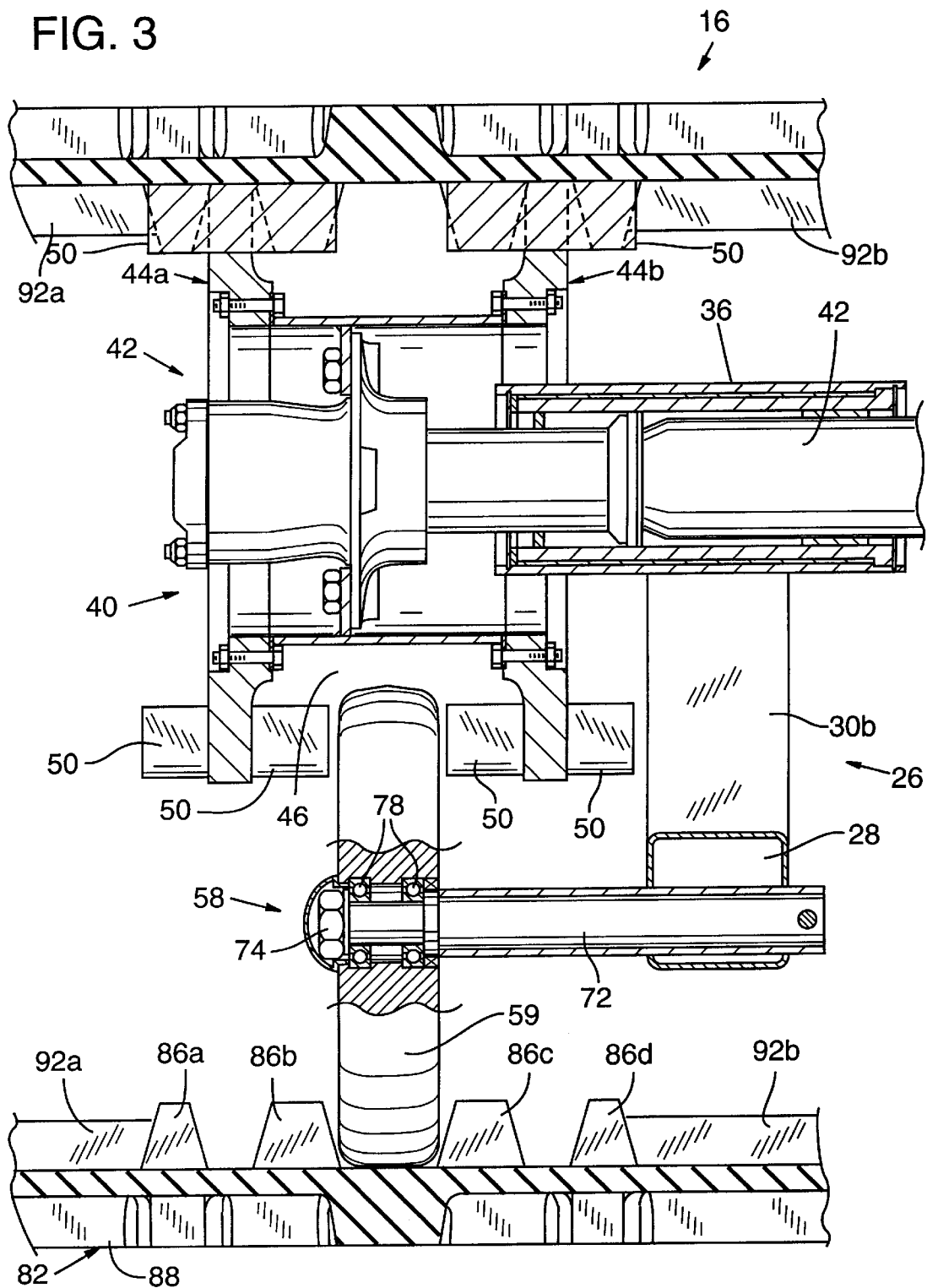
FIG. 3 is an enlarged cross sectional view taken generally along the line 3—3 in FIG. 2.
Figure 4:
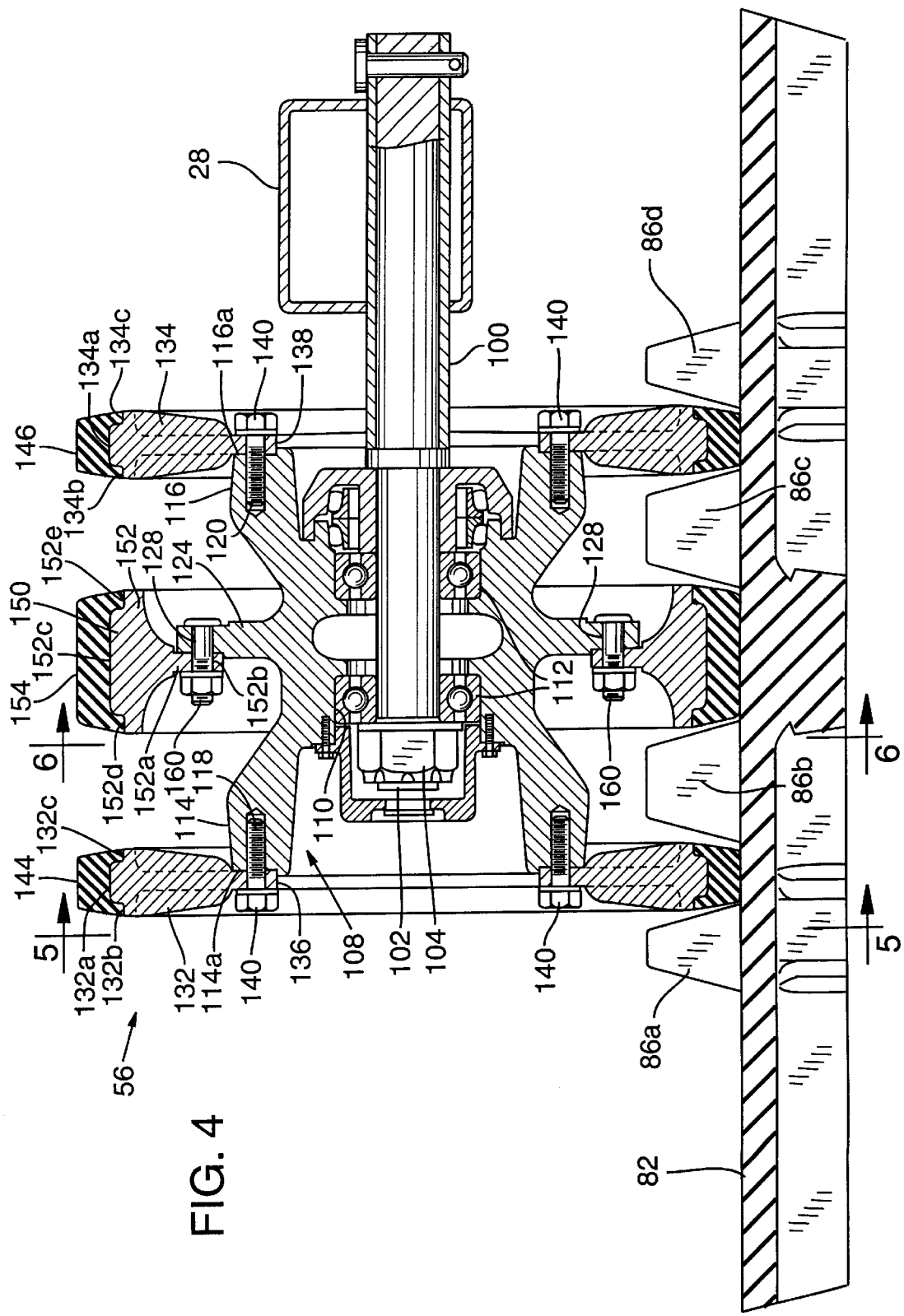
FIG. 4 is an enlarged cross sectional view taken generally along the line 4—4 in FIG. 2.

Referring to FIGS. 2–4, one of the track units 16 is illustrated in greater detail. The track unit is mounted to the vehicle body through a frame structure 26. The frame structure includes an elongate substantially horizontal beam 28 extending longitudinally of the track unit and two sets of diverging legs—outer legs 30a and 30b and inner legs 32a, 32b. The upper ends of legs 30a, 30b, 32a, 32b are secured to a journal tube 36 (FIG. 3) which is mounted to the chassis of body 12. The lower ends of the inner and outer legs are secured to beam 28.

The track unit has a drive wheel 40 at the apex of a generally triangularly-shaped path for the track. Drive wheel 40 is rotatably driven by a powered axle 42 extending through journal tube 36.

Drive wheel 40 includes a drum 42 with sprocket discs 44a, 44b mounted at opposite ends of the drum (FIG. 3). Opposed sprocket discs 44a, 44b are axially spaced apart to form a gap 46 therebetween.

Each sprocket disc 44a, 44b has a plurality of cogs 50 equally-spaced about the circumference of the disc, with each cog 50 rigidly secured thereto and extending perpendicularly outwardly therefrom. Each cog 50 forms a tooth for the sprocket disc.

Five lower, freely rotatable guide wheel assemblies 54, 56, 58, 60, 62 are equally spaced in a line extending longitudinally of the track assembly and alongside beam 28. Wheel assemblies 54, one end of the track assembly is mounted on telescoping a wheel support 66. The telescoping wheel support includes a threaded adjustment assembly which when rotated either extends or retracts guide wheel assembly 54 longitudinally of the track assembly.

Referring to FIG. 3, wheel assembly 58 adjacent drive wheel 40 comprises a single wheel 59 which preferably is made from a resilient material, such as rubber, to absorb vibration. The wheel rotates on a guide wheel spindle, or axle, 72 connected adjacent one of its ends to beam 28. The end of spindle 72 spaced outwardly from beam 28 is threaded to receive a nut 74. The wheel 59 is rotatably mounted on spindle 72 through bearings 78 and is locked thereon by nut 74. As best seen in FIG. 3, wheel 59 is positioned to extend into space 46 between inwardly directed cogs 50 on discs 44a, 44b, respectively.

An endless track 82 is trained about the outside of drive wheel 40, and guide wheel assemblies 54, 56, 58, 60, 62 to form a generally triangularly-shaped track run.

Figure 6:
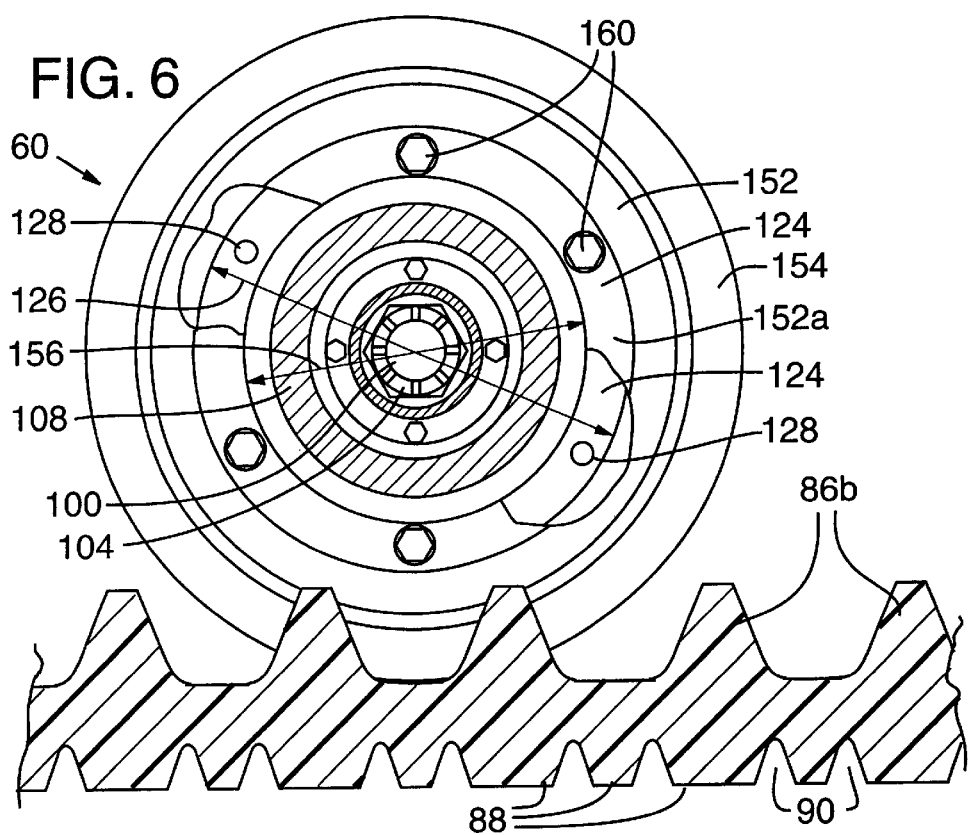
FIG. 6 is a view taken generally along the line 6—6 in FIG. 4.

As best shown in FIGS. 2, 3 and 6, track 82 generally is a one piece endless molded rubber belt with internally cast composite stiffener rods (not shown) preferably of fiberglass composite and positioned every 4.166 inches, extending perpendicular to the track run. Internally cast flexible, stretched-resistant cords (not shown) preferably constructed of a combination of kevlar, nylon, and steel cable extend parallel to the track run. One known manufacturer of endless tracks containing such materials is Camoplast, Inc., located in Plattsburgh, N.Y.

Molded drive lugs 86a, 86b, 86c, 86d molded in place and preferably constructed of hard rubber are positioned on the inside of track 82 to engage and mesh with cogs 50 for driving track 82. As is seen the drive lugs are generally truncated pyramid-shaped. The drive cogs 50 are positioned and shaped to enter the spaces between longitudinally aligned drive lugs 86a, 86b, 86c, 86d to drive the track. As seen in FIGS. 3 and 4, the drive lugs are spaced apart transversely of the track and serve as wheel guides, as will be more fully explained below.

As shown in FIGS. 2 and 3, the molded track, or tread, has traction bars 88, preferably of rubber, extending laterally across the outside of track 82. These are substantially equally spaced around the track periphery. Transversely extending grooves 90 in the tread further improve traction for the vehicle.

A pair of scrapers 92a, 92b (FIG. 3) constructed of hard rubber, molded in place as part of the track and having a generally triangular cross-section, are positioned on the inside of the track. The scrapers are positioned to travel along the track of the path and to aid in clearing debris, such as snow, ice, sand, etc., should it build up in the area about journal assembly 36.

As set out above, and as shown in FIG. 3, guide wheel 59 has been presented as a single wheel sized and positioned to fit comfortably in the space between rotating cogs 50 on drive wheel 40. However, wheel assemblies 54, 56, 60, and 62 are not restricted in design to fit between cogs 50 since they are spaced forwardly and rearwardly from the drive wheel. Wheel assemblies 54, 56, 60, 62 are all substantially similar and are constructed according to a preferred embodiment of the present invention as better illustrated in FIGS. 4–6.

In FIG. 4, wheel assembly 56 is illustrated in greater detail in cross-section. In the past all of the support wheels for the lower reach of the track often have been single wheels as illustrated at 59 in FIGS. 3 and 7. The new wheel assembly, as illustrated at 56, has been constructed so that it may be retrofitted and positioned in the track assembly in place of previously-used single wheels. Thus, a spindle, or axle, 100 is connected adjacent one of its ends to beam 28 and its opposite end extends outwardly over track 82. It has a threaded outer end 102 adapted to receive a nut 104 thereon.

Wheel assembly 56 includes an integral, or unitary, hub 108. The hub has a central bore 110 adapted to receive axle 100 therethrough and have bearings 112 mounted therein to rotatably support hub 108 on axle 100. The hub has a pair of outer flanges 114, 116, at axially spaced ends thereof. Outer flanges 114, 116 have annular radially directed surfaces 114a, 116a, respectively, in which threaded bores 118, 120 are formed. The bores are spaced apart circumferentially about flanges 114, 116. Flanges 114, 116 each have an outer diameter equal to, or no greater than, a first outer diameter indicated generally at 122 in FIG. 5.

A radially extending, or directed, annular central flange 124 on the hub has an outer diameter 126 (FIG. 6) which is greater than first outer diameter 122. Flange 124 has a plurality of through-bores 128 spaced circumferentially thereabout. Flange 124 is positioned between and spaced from outer flanges 114, 116.

A pair of similarly constructed outer wheels 132, 134 are substantially ring-shaped and have inwardly directed annular webs 136, 138, respectively. Each of wheels 132, 134 has an inner diameter less than first outer diameter 122 and radially directed side surfaces which are positioned to engage and rest against contact surfaces 114a, 116a, respectively. A plurality of fasteners, such as bolts 140, extend through circumferentially spaced bores in webs 136, 138 and into threaded bores 118, 120 to secure the outer wheels to flanges 114, 116.

Wheels 132, 134 are comprised primarily of a substantially rigid metal ring, the outer peripheral rim of which has a raised central portion indicated generally at 132a, 134a, respectively (FIG. 4). The rigid metal ring portions have peripheral diameters at regions 132b, 132c and 134b, 134c contiguous their opposite side faces which are less than the diameter of the central portions 132a, 134a of the rim intermediate these side regions.

Formed over and covering the outer peripheral rim of the rigid metal portions of the wheels are elastomeric outer coverings 144, 146 respectively. The outer covering may be of a rubber or polyester material to provide a cushioning between the wheel assembly and track 82.

A central wheel 150 positioned between, or intermediate, wheels 132, 134 is comprised of a substantially rigid metal ring 152 and an elastomeric covering 154. Ring 152 has a radially inwardly directed web 152a which has an inner diameter 156 (FIG. 6) greater than the first outer diameter 122 of the outer hub flanges, but is less than the outer diameter 126 of central flange 124. Web 152a has a plurality of circumferentially spaced through-bores 152b which are positioned to be aligned with bores 128 in central flange 124. When these bores are aligned a plurality of fasteners, such as bolt and nut combinations 160, are extended therethrough to fasten the central wheel to the central flange. The central wheel web 152a and central flange 124 each have radially extending contiguous engaging surfaces which engage, or are in contact with each other, when the central wheel is fastened securely to the central flange.

As with the outer wheels, the outer peripheral rim of metal ring portion 152 has a cross-sectional configuration which has a central portion 152c of a greater diameter than the laterally outwardly positioned peripheral rim portion 152d, 152e contiguous opposite sides of the ring. The elastomeric covering 154 is formed about the outer peripheral edge of ring 152 and has a complementary inner cross section to rest closely and securely against the outer rim of the ring. As is best seen in FIG. 4, the outer peripheral edges of coverings 144, 146, 154 of the wheels are substantially flat as viewed in cross-section and each has substantially the same outer diameter.

Referring still to FIG. 4, outer wheels 132, 134 are positioned at opposite ends of hub 108 and thus are axially spaced apart. Central wheel 150 is positioned between the outer wheels and is spaced from each of them. The central wheel is wider, as measured axially, than each of the outer wheels 132, 134. The width of the central wheel may be substantially twice the width of each of the outer wheels. The spacing and widths of wheels 132, 134, 150 is such that these three wheels nest comfortably between drive lugs 86a, 86b, 86c, 86d.

Figure 5:
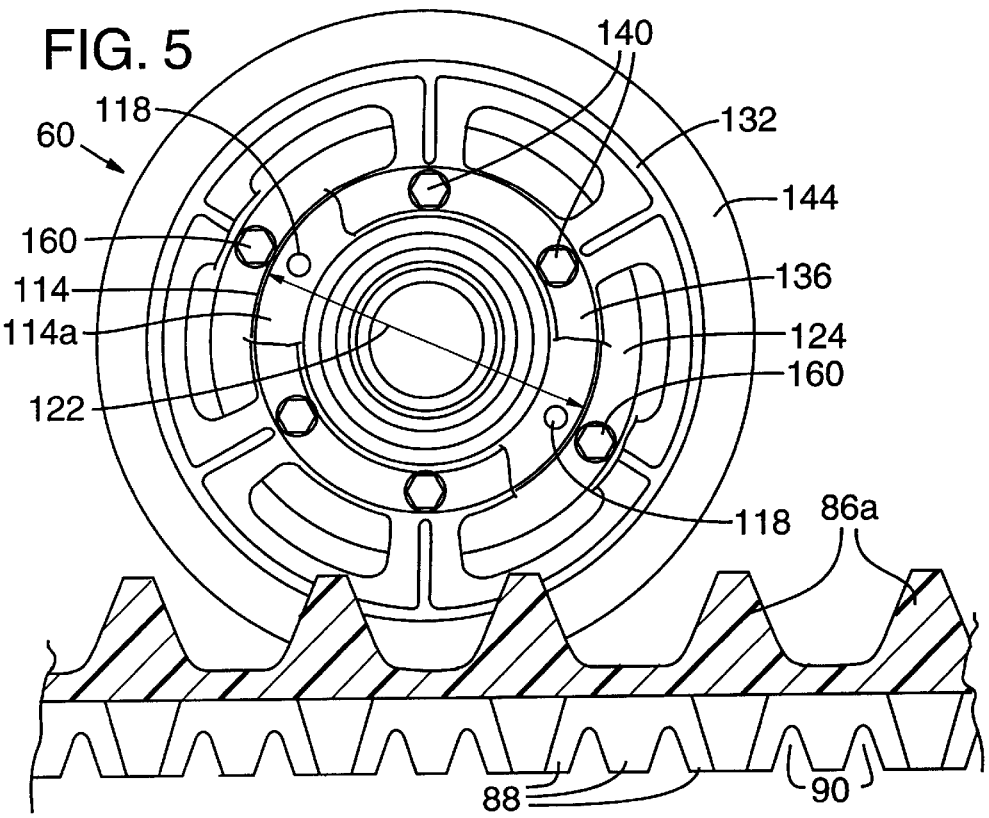
FIG. 5 is a side elevation view of a guide wheel assembly taken generally along the line 5—5 in FIG. 4.

With the wheel assembly illustrated in FIGS. 4–6, one spindle, or axle, and a single bearing set is adequate to mount all three wheels in each such wheel assembly. Further, all three wheels can be removed merely by releasing nut 104 and sliding the wheel assembly from axle 100. The outer wheels may be easily removed and replaced by removal of bolts 140 holding them in place. Further, since the inner diameter of central wheel 150 is greater than the outer diameter of flanges 114, 116 it is a simple matter, once outer wheel 132 has been removed, to release the nut and bolt combinations 160 and slide the central wheel outwardly over outer flange 114.

A prior art device is illustrated in FIG. 7, where only a single wheel, such as that previously illustrated at 59 has been used for all of the supporting guide wheels along the lower reach of a driven track. The track is shown positioned on a side hill at an angle "Y" from the horizontal. Where only single wheels have been used in the past it will be seen that a central point load is imposed on the track and the track deflects upwardly at opposite edges. When on a sloped side hill this can result in a sidewise sledding, or sliding, of the track down the hill.

With the new guide wheel assembly configuration as illustrated in FIG. 4, there is wider and more effective support for opposite edge regions of the track so that there is less tendency for the track to deflect and greater stability will be obtained. Further, since there is not just a single point load at the center of the track, but instead three supporting wheels, there will be less stress on the track and wheels and less maintenance should be required.

While a preferred embodiment of the invention has been described herein, it should be apparent to those skilled in the art that variations and modifications are possible without departing from the spirit of the invention.

What is claimed:

1. A guide wheel assembly for supporting an endless track on a tracked vehicle, comprising a hub adapted to be rotatably mounted on an axle, a pair of outer axially spaced apart wheels mounted on said hub, and a central wheel mounted on said hub between said outer wheels and spaced from each of said outer wheels, said outer wheels and central wheel having substantially equal outer diameters, and said hub comprises a pair of axially spaced outer flanges on which said outer wheels are mounted and a central flange to which said central wheel is mounted, said outer flanges having outer diameters no greater than a selected first outer diameter, and said central flange having an outer diameter greater than said first outer diameter.

2. The assembly of claim 1, wherein said central wheel comprises a substantially rigid ring having an inner diameter greater than said first outer diameter.

3. The assembly of claim 2, wherein said outer wheels comprise substantially rigid rings each having an inner diameter less than said first outer diameter.

4. The assembly of claim 2, wherein said the outer diameter of the central flange is greater than the inner diameter of the central wheel, said central wheel has a radially extending side surface, said central flange has a radially extending side surface and said side surface of the central wheel engages said side surface of the central flange when mounted.

5. The assembly of claim 4, which further comprises a plurality of fasteners securing said central and outer wheels to said hub.

6. The assembly of claim 1, wherein said central wheel has a first width measured axially of the assembly and an outer wheel has a width different from said first width.

7. The assembly of claim 6, wherein said outer wheel is narrower than said central wheel.

8. The assembly of claim 3, wherein one of said outer flanges has a radially extending engaging surface, an outer wheel to be mounted on said one outer flange has an inner diameter less than said selected first outer diameter and a radially extending engaging surface, said outer wheel being mounted to said one outer flange with the engaging surfaces of said wheel and outer flange in contact with each other.

9. A track unit for a tracked vehicle comprising
   a track frame,
   a powered rotatable track drive element,
   a plurality of guide wheel assemblies rotatably mounted on the frame in line with each other along a line extending substantially longitudinally of the vehicle, and
   an endless track trained about the drive element and guide wheel assemblies to be driven by the drive element and to be supported on the ground by the guide wheel assemblies,
   a guide wheel assembly comprising an axle mounted on the frame, a hub mounted on said axle, a pair of axially spaced outer wheels mounted on said hub, a central wheel mounted on said hub between and spaced from said outer wheels, said outer wheels and central wheel having substantially equal outer diameters, and said hub comprises a pair of axially spaced apart outer flanges on which said outer wheels are mounted and a central flange on which said central wheel is mounted, said outer flanges having outer diameters no greater than a selected first outer diameter, and said central flange having an outer diameter greater than said first outer diameter.

10. The track unit of claim 9, wherein said central wheel comprises a substantially rigid ring having an inner diameter greater than said first outer diameter.

11. The track unit of claim 10, wherein said outer wheels comprise substantially rigid rings each having an inner diameter less than said first outer diameter.

12. The track unit of claim 10, wherein the outer diameter of the central flange is greater than the inner diameter of the central wheel, said central wheel has a radially extending side surface, said central flange has a radially extending side surface and said side surface of the central wheel engages said side surface of the central flange when mounted.

13. The track unit of claim 12, which further comprises a plurality of fasteners extending through aligned holes in said central wheel and central flange to secure said central to said hub.

14. The track unit of claim 9, wherein one of said outer flanges has a radially extending engaging surface, an outer wheel to be mounted on said one outer flange has an inner diameter less than said selected first outer diameter and a radially extending engaging surface, said outer wheel being mounted to said one outer flange with the engaging surfaces of said wheel and outer flange in contact with each other.

15. An endless track unit for a four-track tracked vehicle comprising;
   a track frame,
   a powered rotatable track drive element,
   a plurality of guide wheel assemblies rotatably mounted on the frame in line with each other along a line extending substantially longitudinally of the vehicle, and
   an endless track trained about the drive element and guide wheel assemblies to be driven by the drive element and to be supported on the ground by the guide wheel assemblies,
   a guide wheel assembly comprising an axle, a unitary hub rotatably mounted on said axle, said hub having a pair of axially spaced outer flanges having outer diameters no greater than a first diameter and a central flange having an outer diameter greater than said first diameter, a pair of axially spaced outer wheels mounted on said outer flanges of the hub, a central wheel mounted on said central flange of the hub between and spaced from said outer wheels, and said outer wheels and central wheel having substantially equal outer diameters.

16. The track unit of claim 15, wherein said central wheel comprises a substantially rigid ring having an inner diameter greater than said first outer diameter.

* * * * *

UNITED STATES PATENT AND TRADEMARK OFFICE
CERTIFICATE OF CORRECTION

PATENT NO. : 6,129,426          Page 1 of 1
DATED      : October 10, 2000
INVENTOR(S) : Jasper James Tucker It is certified that error appears in the above-identified patent and that said Letters Patent is hereby corrected as shown below:

Column 3,
Line 58, "Wheel assemblies 54, one" should be -- Wheel assembly 54 at one --.

Column 6, claim 4,
Line 66, "said the outer" should be -- said outer --.

Column 7, claim 8,
Line 14, "of claim 3" should be -- of claim 1 --.

Column 7, claim 9,
Lines 27-28, "vehicle, and" should be -- vehicle, --.
Line 32, "assemblies," should be -- assemblies, and --.

Column 8, claim 13,
Line 12, "said central to" should be -- said central wheel to --.

Column 8, claim 15,
Lines 27-28, "vehicle, and " should be -- vehicle, --.
Line 32, "assemblies," should be -- assemblies, and --.

Signed and Sealed this

Twenty-fifth Day of December, 2001

*Attest:*

JAMES E. ROGAN
*Attesting Officer*   *Director of the United States Patent and Trademark Office*